(12) United States Patent
Ishii

(10) Patent No.: US 7,986,344 B1
(45) Date of Patent: Jul. 26, 2011

(54) IMAGE SAMPLE DOWNLOADING CAMERA, METHOD AND APPARATUS

(75) Inventor: Kensuke Ishii, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 370 days.

(21) Appl. No.: 12/252,659

(22) Filed: Oct. 16, 2008

(51) Int. Cl.
*H04N 5/232* (2006.01)
(52) U.S. Cl. .................................................. 348/211.3
(58) Field of Classification Search ............... 348/211.2, 348/211.3; 709/203
See application file for complete search history.

(56) References Cited

U.S. PATENT DOCUMENTS

| 5,926,116 A * | 7/1999 | Kitano et al. ................. 709/217 |
| 6,504,571 B1 * | 1/2003 | Narayanaswami et al. ....................... 348/231.99 |
| 2003/0195945 A1 * | 10/2003 | Honda et al. .................. 709/219 |
| 2005/0162523 A1 * | 7/2005 | Darrell et al. .............. 348/211.2 |
| 2008/0129835 A1 * | 6/2008 | Chambers et al. .......... 348/231.2 |
| 2008/0297608 A1 * | 12/2008 | Border et al. ............ 348/207.11 |
| 2008/0298689 A1 * | 12/2008 | Ashbrook et al. ......... 348/222.1 |
| 2011/0069196 A1 * | 3/2011 | Jung et al. .................. 348/222.1 |

* cited by examiner

*Primary Examiner* — Jason Whipkey
(74) *Attorney, Agent, or Firm* — Sheppard Mullin Richter & Hampton LLP

(57) ABSTRACT

A digital camera is provided, comprising a body containing an image sensor, a lens attached to the camera body and configured to focus a scene onto the image sensor. The digital camera also includes a wireless communication unit for communicating with a service host. In addition, the digital camera includes a control unit and a download setting unit. The digital camera also contains executable program code embodied in a computer readable medium and configured to cause the download setting unit to select a subset of digital images to download from a communication network in response to a user query.

20 Claims, 9 Drawing Sheets

IMAGE SAMPLE DOWNLOADING CAMERA, METHOD AND APPARATUS

TECHNICAL FIELD

The present invention relates to digital image sharing and transfer, and more particularly, some embodiments relate to image sample downloading operating in conjunction with location and navigation information.

DESCRIPTION OF THE RELATED ART

Photography is derived from the Greek words photos, meaning light, and graphein, meaning to draw. It is widely believed that the word was first used by the scientist Sir John F. W. Herschel in 1839. Photography originally involved the recording of images as a result of light impinging on a photosensitive material. Early photographs were exposed as positives onto metal plates that had been sensitized to accept the image. Examples of such include Daguerréotypes, which were metal sheets upon which a positive silver image was made, and tintypes, in which a thin sheet of iron provided a base for light-sensitive material. It is William Henry Fox Talbot, however, that is often credited with inventing a process of capture the image on a negative, and using the negative to create prints. Eventually, photography evolved into a process by which the sensitized materials were coated on plate glass.

Perhaps the most significant historical advancement was in 1889, when George Eastman used a film comprised of emulsions coated on a flexible base. The flexibility this film meant that it could be rolled into a smaller package, enabling cameras to be made much smaller than was previously practical. This enabled small, cost effective cameras to be mass produced and available to the public in unprecedented volumes. Later, color films were introduced and made commercially viable.

Photography has evolved from its earliest forms into a variety of different photographic platforms. For example, other forms of radiation such as infrared, X-Ray or other radiation might be used to record images. As yet a further example of the evolution of photography, sequences of images can be captured and replayed as motion pictures. More recently, a major advancement of photography has been the commercialization of digital still and motion photography. With digital cameras, light sensitive semiconductor devices, such as charge-coupled devices, are used to capture the image and processing technology is used to capture the image and store it in a memory or other storage device. Digital cameras themselves have evolved, adding more pixel capability and expanding to include professional and prosumer grade digital single lens reflex (DSLR) cameras capable of utilizing a wide array of interchangeable lenses, filters, and accessory flash units.

With advances in electronics, consumers have available to them a multitude of photographic and other image capture devices that were previously unavailable. Improvements in power consumption, storage densities, miniaturization and display technology, to name a few, have enabled rapid advances in image capture devices. Take, for instance, electronic content capture, storage, view and delivery devices such as, for example, digital cameras, digital video cameras and the like. Such devices are commonplace in contemporary society at the consumer, professional and prosumer level. Digital cameras, camera phones, video cameras and players, digital photo albums, and other image capture devices are seemingly ubiquitous. With the proliferation of such image capture devices, more and more users are seeking the ability to share images amongst their family, friends and coworkers. Digital still and motion images are frequently transferred electronically among these groups using, for example, email and other transport mechanisms.

Photography has become very popular, especially to record travel and leisure activities. More and more consumers seek to improve the quality of their photographs and desire to learn from the work of professional and other skilled photographers. With a film camera, the user often had to wait for the film to be developed before he or she was able to analyze photographs taken to determine the specific improvements needed to take better pictures. In addition, film is costly to use and this tends to lead to conservative photo-taking. Most professionals and how-to manuals advise beginners and those seeking to improve to take many photographs and study them carefully. Given the expense of film and development and considering the time lag between taking the photograph and seeing the developed print, learning photography with film cameras can be slow and frequently frustrating. This learning curve may be further complicated by the interchangeable lenses, filter, and flash units of DSLRs. The user needs to become familiar with the appropriate circumstances for the use of each lens type. For example, when a fish-eye lens is preferable to a wide angle lens or when a zoom lens or fixed focal length telephoto lens is the best choice. Not just lens choice, but filter choice can have a great effect on the image and should be considered. For example, a polarizing filter may be used to deepen the sky tones in a landscape or a red filter may be used to intensify fall colors. All of these factors require time and knowledge to master.

Digital cameras greatly assist the learning process by making it easier and more cost-effective for the amateur photographer to take more shots. However, most amateurs would benefit from studying the work of professional photographers at the moment of composing the photograph, something not available with film or prior digital cameras. Many amateurs plan to take photographs during vacations to various locales. Previously, when shooting film, many amateurs received an unpleasant surprise when they viewed their film photographs. Most amateurs developed their film either days after returning home, or by dropping off the film during a vacation. Any errors may be found after the trip is completed or a site has been visited, too late to return for another attempt.

Contemporary digital cameras offer some relief to this problem by providing an LCD or other like viewing screen, allowing real-time viewing of captured images. However, viewing of images on these small screens and often in poor-lighting doesn't always give the photographer an accurate view of how the captured image will appear when printed or when viewed on an appropriate monitor. Additionally, even where the amateur photographer is able to see in real time that the image quality is poor, he or she may not know the reason for the poor rendition or what settings, adjustments or steps might be needed to improve the image quality. For users of DSLRs this problem may be compounded by poor lens choice for the conditions. The wide array of lenses for DSLR cameras may include: fixed focal length, wide angle, fish-eye, zoom, and telephoto as well as macro lenses for specialized applications. Learning which lens and filter to use under various conditions can be time consuming and frustrating. Adding filters may compound the user's learning curve.

Most digital cameras offer a fully automatic or programmed mode, allowing point-and-shoot operation without requiring a large amount of user intervention. However, while these modes allow relatively error-free shooting for most casual circumstances, automatic operation can be 'fooled' by certain conditions such as, for example, backlit subjects that can cause the program to think that the subject is lighter than it really is. While such conditions might be compensated for (without recomposing the scene) by the use of spot metering, fill flash or exposure compensation, beginning photographers might not be aware of these techniques.

Another technology that has gained in popularity with consumers at the same time frame as digital photography is the use of GPS, or global positioning system units, or other navigation devices. These GPS units or navigation devices are able to locate specific positions, sites, or attractions and present the user with directions to visit attractions or identified locations. The location of the individual holding the GPS unit can also be provided in real time.

There is a need in the art for a digital camera that may provide a tutorial function to the user through a wireless host. The wireless host may, in response to a user query, provide examples of the work of professional photographers using the same camera, lens and settings. In addition, GPS or navigation functionality may be incorporated to provide the amateur photographer with tutorial examples of a professional photographer shooting with the same camera, lens and setting at the same location.

BRIEF SUMMARY OF EMBODIMENTS OF THE INVENTION

According to various embodiments of the invention a digital camera is provided. The camera comprises a camera body with an image sensor located within the camera body. The camera also includes a lens configured to focus a scene onto the image sensor. A wireless communication unit for communicating with a service host that retains copies of images is also provided. The wireless communication unit serves to convey the user's query to the service host and also relays the thumbnail images that to the user's camera in response to the query. The camera also includes a control unit and a download setting unit. The downloading operation is facilitated through the use of executable program code embodied in a computer readable medium. The executable program code causes the download setting unit to select a subset of digital images to download from the service host in response to the user's query.

An additional embodiment provides a method for downloading images. The method comprises the steps of: connecting to a service host through a wireless connection, sending a query to the service host requesting a subset of digital images that match a user-specified criteria. The service host processes the query and selects thumbnail images that match the user's query. Upon receipt of the thumbnail images the user reviews the images and selects those images for downloading. The images selected for downloading are relayed to the service host through the wireless connection. The service host responds by selecting the images and relaying the chosen images to the user's camera.

Yet another embodiment provides computer-executable code contained on a computer-readable medium for downloading images that satisfy a user's query. The computer-executable code is comprised of: first executable program code to cause a computer to connect to a service host through a wireless service unit; second executable program code to cause a computer to send a query to the service host requesting a subset of digital images that match a user-specified criteria; third executable program code to cause a computer to receiving thumbnail images from the service host that match the user-specified criteria; fourth executable program code to cause a computer to select images to download from the thumbnail images in response to a user's selection; fifth executable program code to cause a computer to send a request to the service host for the selected images; and sixth executable program code to cause a computer to download the selected images.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
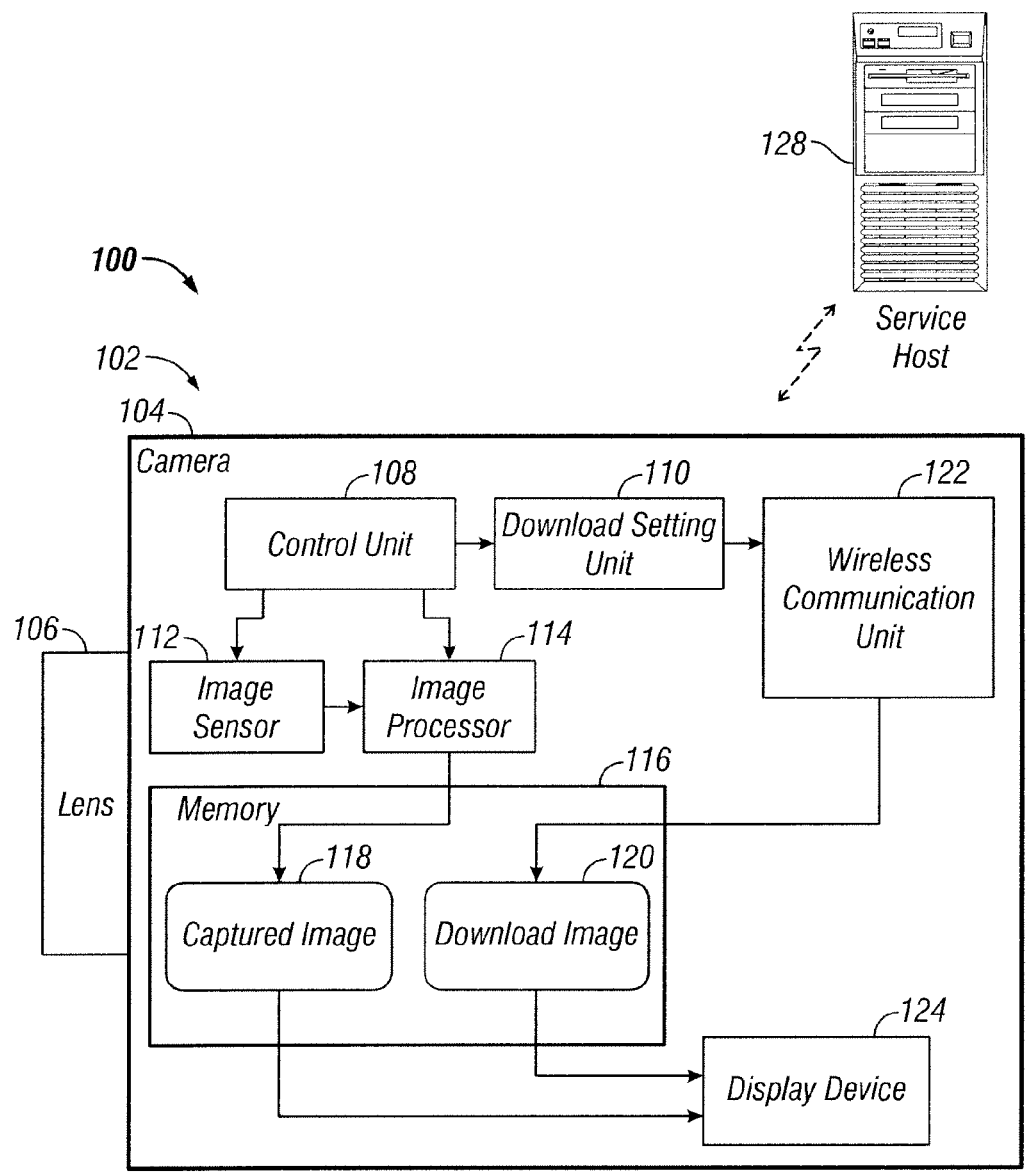
FIG. 1 is a diagram illustrating an exemplary block diagram of an image sample downloading camera device in accordance with an embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for an digital camera configured to download images and other data. Particularly, in one embodiment, camera information such as, for example, camera model, lens, accessories, location information and/or camera settings is sent via a wireless network to a service host. In response to a user query, the service host sends thumbnail photographs to the user's camera. The query may be a request to see samples of a professional photographer's use of the same or similar camera, lens, and/or settings. In a further embodiment, the user's camera incorporates location, navigation or GPS information and the user may query the service host for sample photographs taken by professional photographers or the user at the same location. In still another embodiment, the service host may suggest locations for taking photographs based on the location information provided by the camera to the host. For example, the host might provide directions to points of interest for photography, suggest times of day to take photographs at various locations based on date information and provide sample images from professional photographers that suggest vantage points.

Before describing the invention in detail, it is useful to describe an example electronic device with which the invention can be implemented. One such example is that of a digital camera. In one example, a digital camera can include a series of optical elements (i.e., a lens) that is configured to focus light to create an image of a scene. With digital cameras, however, instead of focusing this light onto a conventional light sensitive film at the focal plane, the scene is focused onto a semiconductor image sensor, such as, for example, a CCD (charge coupled device) or CMOS (complementary metal oxide semiconductor) image sensor. The image sensor has several cells, corresponding to pixels, that respond electronically to the light focused thereon. In other words, the image sensors convert light into electrons. The accumulated charge for each cell is read out as an electrical signal, which, for a CCD, is converted into a digital pixel value in binary form. The CMOS signal is digital, so conversion is not necessary. The electrical signals created are clocked out of the sensor and processed by an image locally in fixed or removable memory and later transferred to a computer or other external host.

Because a digital image is created and stored, it can also be displayed. This allows the photographer to view the image on a display after the photograph is taken. LCD display panels, for example, are commonplace on digital cameras and digital video cameras to allow image viewing. A display device provides for display of the received thumbnail photographs as well as photographs taken with the camera assembly. As such, electrical interfaces and drivers are provided to allow a preview of the image to be viewed as well as to display the exposed image stored in memory. Such displays might also provide a user interface for additional features such as displaying exposure characteristics, facilitating camera set up through menus or other like means, as well as displaying operational modes of the camera (for example, flash status, exposure compensation, focus mode, shutter/aperture settings and the like). Some cameras even use touch screen displays as a form of user interface to allow control and selections to be performed with a minimal use of buttons and switches. This is popular with some digital video cameras.

From time-to-time, the present invention is described herein in terms of this example electronic imaging device. Description in terms of these environments is provided to allow the various features and embodiments of the invention to be portrayed in the context of an exemplary application. After reading this description, it will become apparent to one of ordinary skill in the art how the invention can be implemented in different and alternative electronic devices beyond still and motion digital cameras, including, for example, printers, digital photo albums, computers and computing devices, mobile telephones, PDAs, image playback devices, monitors, televisions and any of a number of other electronic devices.

The present invention is directed toward a system and method for an image sample downloading camera. The camera may be any of a variety of digital cameras or the like, from a simple point-and-shoot camera to a more complex DSLR, with interchangeable lenses and accessories. The accessories may include lenses and various filters as well as a camera-mountable external flash unit. In accordance with one or more embodiments of the invention, the camera may include features such as functionality for downloading sample images or thumbnails in response to a user query. In other embodiments other information might be downloaded such as, for example, points of interest for photographically desirable scenes or attractions, directions to such points of interest, recommended shooting angles, times of day recommended for shooting, recommended camera settings or lens selection (for example, use a fill flash, shoot from a distance with a telephoto lens versus shoot up close with a wide-angle lens, adjustments to exposure compensation settings, and so on) and recommended lens and accessory selection (for example, use a wide-angle lens with a polarizing filter).

The camera can be configured with a communications interface to allow the user to present queries to the service host to obtain information about photographing images at a desired location. As noted, the query might send location and date and time information to the service host and seek photographic tip information such as images taken by professional photographers, point-of-interest information, camera settings, lens selection, accessory use, and so on. Accordingly, various queries allow the user to see sample thumbnails taken by professional photographers using the same or similar camera, and/or lens, and can also provide information on how the camera was configured to take the sample images. Additional information on the samples can also be provided such as weather conditions, lighting, time of day, sun angles, date and so on.

Further queries may allow the user to download thumbnails taken by professional photographers or other tutorial information for a given location. For example, the camera may incorporate its location into the query based on navigation or GPS position location information obtained by the camera. In another embodiment, the user may enter location information such as for example, by entering latitude/longitude coordinates, map coordinates, address, cursor positioning on an electronic map provided on the screen of the camera, identifying a point of interest or other locational determination method. In such embodiments, the images and information returned can be specific to the points of interest or locational information provided in the query and can be used by the photographer to help frame and compose the shots as well as to help with camera settings.

In yet a further embodiment, control logic might be provided to allow the camera to be automatically configured based on information received from the host. For example, given the camera location, date and time, and given a point of interest to be photographed, the information from the service host in one embodiment is used to adjust the camera settings for image capture. This can be done in real-time to allow photography to occur without undue delay. In another embodiment, the user can browse the received images and select the image having the desired quality or effects. Then, the camera can be automatically configured using setting data associated with that image.

The present invention may also incorporate a wireless connection to a service host to provide for transmission of the user's query. The service host can serve as a repository for thumbnails and other information. In another embodiment, the service host may format and send additional queries based on the photographer's query to retrieve information from other servers or hosts. In a further embodiment, the user may also query the service host to provide photographs taken by the user on a previous occasion using the same camera, settings, lens, or location.

FIG. 1 is a diagram illustrating an exemplary block diagram of an image capture device or camera in accordance with one embodiment of the invention. Referring now to FIG. 1, the system 100 includes a camera assembly 102 and a service host 128. The example camera assembly 102 illustrated includes a camera 104, a lens 106, a control unit 108, a download setting unit 110, a wireless communication unit 122. The camera 104 also includes an image sensor 112 and an image processor 114, a memory or other storage device 116. Shown in memory 116 are a captured image 118 and a downloaded image 120. Display device 124 might be an LCD or other like display configured to display a scene to be selected for photographing, a captured image, camera menus and other features.

In the illustrated example implementation, camera 104 includes one or more optical elements or lenses 106 that can be used to capture a scene and focus the scene onto a focal plane. Lens 106 might typically include a plurality of optical elements that are configured to operate together to provide the ability to zoom into and out of the scene as well as to focus the scene onto the focal plane. Lens 106 can be implemented in a relatively simple fashion such as, for example, a fixed-aperture single-element lens, or a more complex structure such as a multi-element variable-aperture lens. Additionally, manual or auto focusing features can be provided. For DSLRs a wide variety of interchangeable lenses including, wide-angle, fish-eye, zoom, and telephoto lenses are available.

As noted, lens 106 is typically used to focus a scene onto a focal plane. An image sensor 112 might be provided at the focal plane to receive the optical image and convert it into an electrical signal representative thereof. As discussed above in the description of an example environment, an image sensor 112 might be implemented as a CCD or CMOS image sensor, which is a semiconductor device configured to accept the light focused thereon and output an electrical representation of the optical image. Depending on the type of image sensor utilized, an analog-to-digital converter might be provided to divert the electrical signals to a digital format such that the image can be processed, for example, by an image processor 114. Image sensors might be implemented to provide color data for color images.

An image processor 114 can be included to process the digital image data to create a digital picture or digital rendition of the image captured. For example, image processing might include processing functions used to format the digital data into an appropriate image format, perform any desired image processing such as, for example, sharpening, smoothing, light balancing, and so on; performing image compression, and creating the appropriate image file format such as, for example, JPEG, TIFF and the like.

A processed image or a raw image file might be stored on a variety of storage devices such as, for example, a memory device 116 or a removable memory element, not shown in FIG. 1. For example, various forms of internal and removable memory might be provided to facilitate local storage as well as removable storage. An example of removable memory might include, for example, a removable flash memory card. Memory device 116 might also store software or other processing functions used to process images or otherwise control the operation of camera 104. Additionally, memory device 116 might store menu screens and other like devices for display to the user during set up or configuration operations. Memory device 116 also stores the captured image 118 taken by the user and the downloaded image 120. The downloaded image 120 may be thumbnails sent by the service host 104. As mentioned above, the thumbnails may be used as tutorial examples to the camera user and may be photographs taken by professional photographers that match the user's query.

A control unit 108 might be provided to control the various functions of the camera 104 as described herein. A control unit 108 might be implemented utilizing various forms of control logic including, for example, processors, controllers, ASICs, PLAs, discrete logic and the like. For example, a control unit 108 might control functions such as auto-focus functions, camera set-up functions, image transfer functions, image recognition and selection functions, and so on. Control unit 108 may also include location or navigation information. In embodiments where the navigation or location system uses GPS signals or other wireless signals an antenna, not shown in FIG. 1, may also be provided. Control unit 108 may be implemented utilizing various forms of control logic including: processors, controllers, ASICs, PLAs, discrete logic and the like.

Navigation or location control logic provides the functionality to implement the location feature and operation of the image downloading camera. As part of the operation, the navigation or location logic determines the current location of the camera and includes the information along with the camera user's query sent over the wireless network to the service host. The navigation functionality can also be used to provide a data store of points of interest and to calculate directions to desired locations. In the embodiment illustrated in FIG. 1, the functions performed by the navigation or location control logic can be combined with the functions performed by the control unit 108. The control unit 108 interfaces with the download setting unit 110, the image sensor 112 and the image processor 114. One embodiment of a camera that includes GPS or like locational features is that disclosed in co-pending application of common assignee, application Ser. No. 11/258,999, publication number 2007-0091172 A1.

Memory device 116 may store captured images 118 and can also store downloaded images 120. Memory device might also store other data, such as location information, at the camera. Memory device 116 may be implemented as a removable memory card, such as, for example, a compact flash or other similar memory card. In one embodiment, memory device 116 can be removable from the camera 102 to facilitate the transfer of information and images to and from memory device 116.

Also illustrated in the camera 104 of FIG. 1 is a wireless communication unit 122. Wireless communication unit 122 might be used for a variety of applications including providing a communications interface to other electronic devices including printers, other cameras, computer systems, networks and the like. In an embodiment, wireless communication unit 122 interfaces with service host 128 to send and received query information and thumbnails. A variety of wireless communication protocols might be implemented to provide the interface depending on the operational environment anticipated. For example, the bandwidth required for transferring images, the desired range of operation, the desired speed of operation, and other like parameters may drive the choice of the wireless interface. In one example embodiment, wireless interfaces such as, for example, the WiMedia OFDM specification, Bluetooth, 802.11, and other interfaces might be utilized. In addition to these standards-based interfaces, proprietary interfaces might also be utilized.

A display device 124 is also included in camera 102. The display device 124 may be implemented as an liquid crystal display (LCD) and can be provided in a variety of sizes and aspect ratios. Display device 124 can be used to display the user's photographs or captured images, and to display thumbnail photographs sent wirelessly by the service host, 128. In addition, display device 124 also displays the downloaded photographs sent in response to the camera user's queries.

A download setting unit 110 provides a mechanism to upload the camera 104 settings including model number information, settings, and lens 106 information to the service host. To provide this upload functionality the download setting unit is communicatively coupled to the control unit 108, which controls various camera settings, and is also communicatively coupled to wireless communication unit 122, which transmits the camera model information, settings, and lens information to service host 128.

Figure 2:
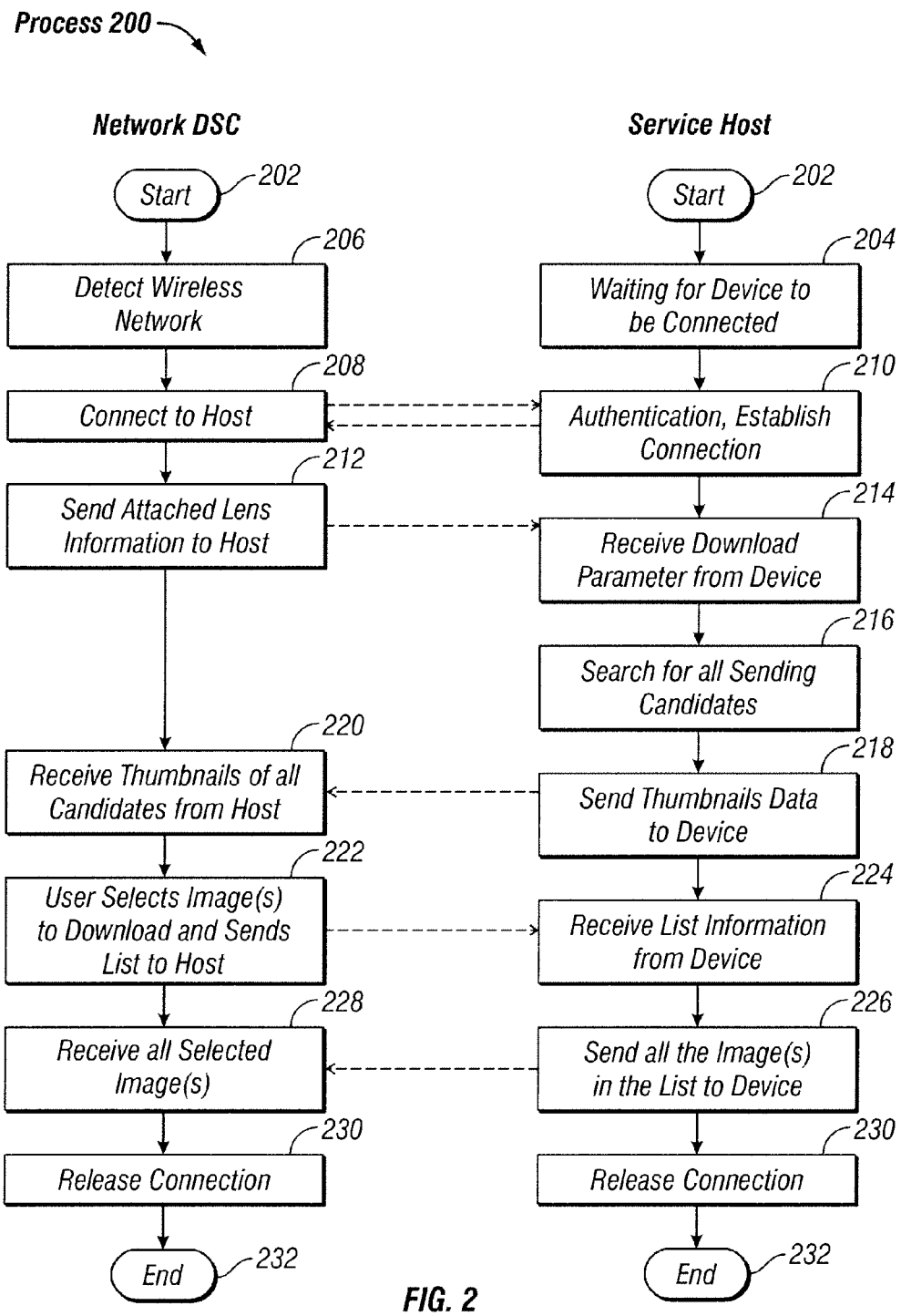
FIG. 2 is a flow diagram illustrating an example process for connecting to a wireless network and host and downloading tutorial example photographs in accordance with one embodiment of the invention.

Having thus described an example of digital camera with which the present convention can be implemented, an example operation of the invention in accordance with one embodiment is now described. FIG. 2 is a diagram illustrating an example process for transmitting a query to the service host and receiving thumbnails in response.

The process 200 begins at step 202, where the camera is powered up and the user formulates the query. In one embodiment, the user can request particular types or quantities information based on his or her skill level or desires. In another embodiment, the process can occur automatically upon power up or when the camera is placed in a query mode. In another embodiment, the queries can be based on user profiles stored at the camera or at the service host and, in such embodiments, the process can be customized on a per-user basis.

The service host waits for the camera to be connected in step 204. In step 206 the camera detects the wireless network. The camera then connects to the host in step 208. The host authenticates and establishes a connection with the camera in step 210. For example, in one embodiment the camera can send username and account information to authenticate the camera or the camera's user. In some embodiments, different levels of service can be established, account usage tracked and so on. In one embodiment, account activity can be tracked and billed on a usage basis.

Once authenticated, the camera then sends the query such as, for example, camera, lens, setting and/or other information in step 212. In response, the service host receives the download parameters from the camera device, in step 214. The service host then parses the query and searches for all candidate photographs or other responsive information in step 216. Once the selection is made, the service host sends the thumbnails or other responsive information to the camera in step 218.

The user's camera receives the thumbnails or other information in step 220. Because the thumbnails as small photographs it may not be possible for the user to see all the detail wanted. Accordingly, in one embodiment, the user can view the thumbnails and select which photographs to download in larger format for easier or more detailed viewing in step 222. Likewise, the user can preview images and determine which additional information to download associated with selected information. This information is transmitted to the service host in step 224. The service host responds by sending the requested photographs to the user's camera in step 226. The user's camera receives the requested higher resolution photographs or other additional information in step 228. This process can be repeated for additional images or information. With the user's query answered, the connection between the user's camera and the service host is released by both the user's camera and the service host in step 230. The process ends at that point, 232.

Figure 2A:
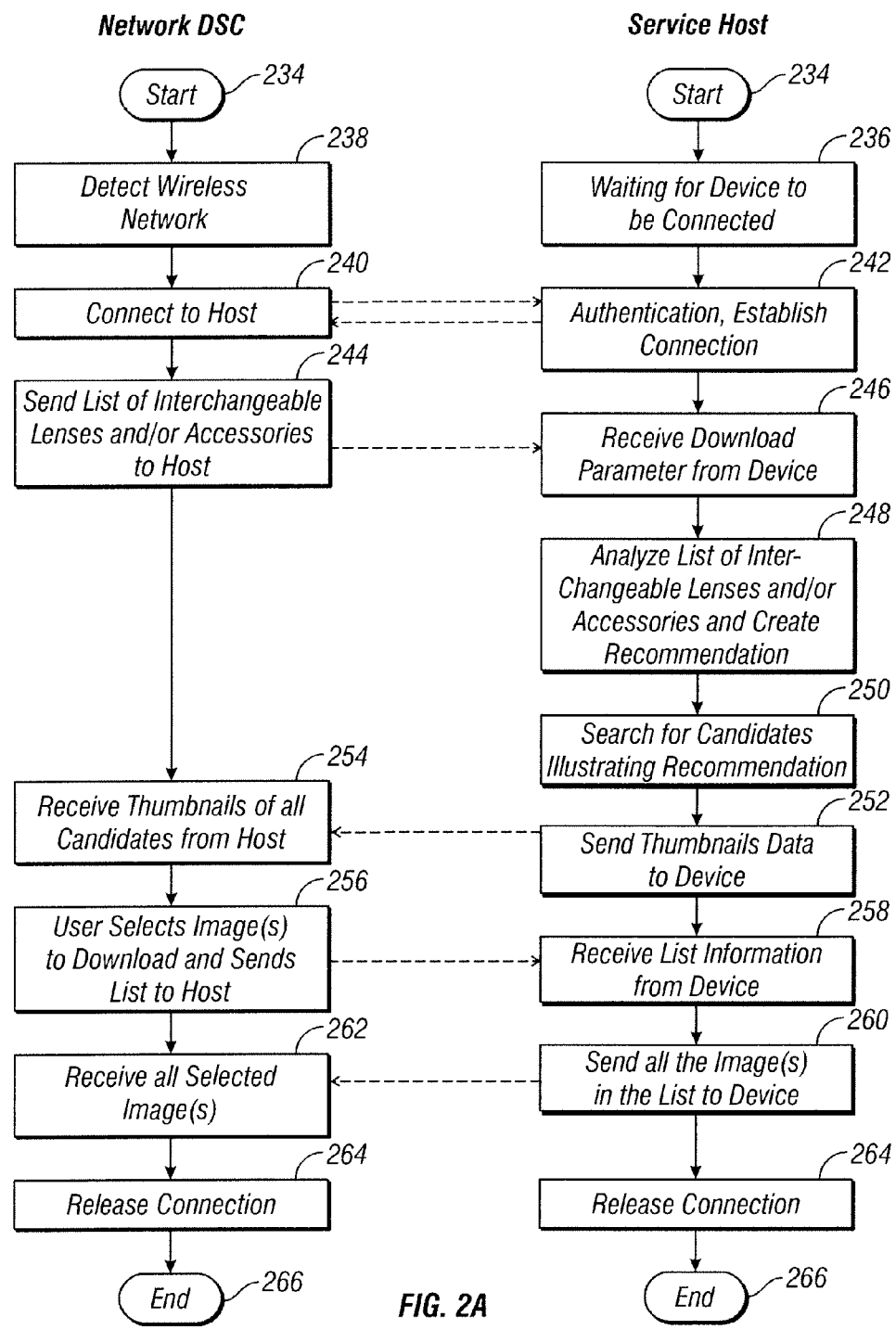
FIG. 2a is a flow diagram illustrating an example process for connecting to a wireless network and host and downloading tutorial example photographs for a user's list of interchangeable lenses and/or accessories.

FIG. 2a illustrates another example process for responding to a camera user's query. The example process illustrated in FIG. 2a can be used to determine which interchangeable lens or filter to use. The process starts at step 234. The service host waits for a device to be connected in step 236. The camera detects the wireless network in step 238. In step 240, the camera connects to the host. The service host authenticates and establishes a connection with the camera in step 242. The camera then sends a list of interchangeable lenses and accessories to the service host in step 244. The list might be compiled by the user and entered into the camera, or the camera might log lenses previously attached to and recognized by the camera.

The service host reviews the list of interchangeable lenses and filters and creates a recommendation for the camera user in step 248. The service host searches for candidate photographs and other information illustrating the recommendation in step 250. The service host sends the thumbnail photographs or other responsive information to the user's camera in step 252. The user receives the thumbnails and information at the camera in step 254. Because the thumbnails are small images, it may not be possible for the user to see all the detail wanted. Accordingly, in one embodiment, the user can view the thumbnails and select which images to download in larger format for easier or more detailed viewing. Likewise, the user can preview images and determine which additional information to download associated with selected information.

The user reviews the list and selects which images to download and sends the list to the service host in step 256. The service host receives the list of thumbnails from the user's camera in step 258. The service host sends the selected images in step 260. The user's camera receives the images in step 262. Once the photographs are received the connection is released by the user's camera and the service host in step 264. The process ends at step 266. The images can be downloaded with information including lens and camera settings, date and time information, filter information and other information enabling the user to better duplicate the image.

Figure 2B:
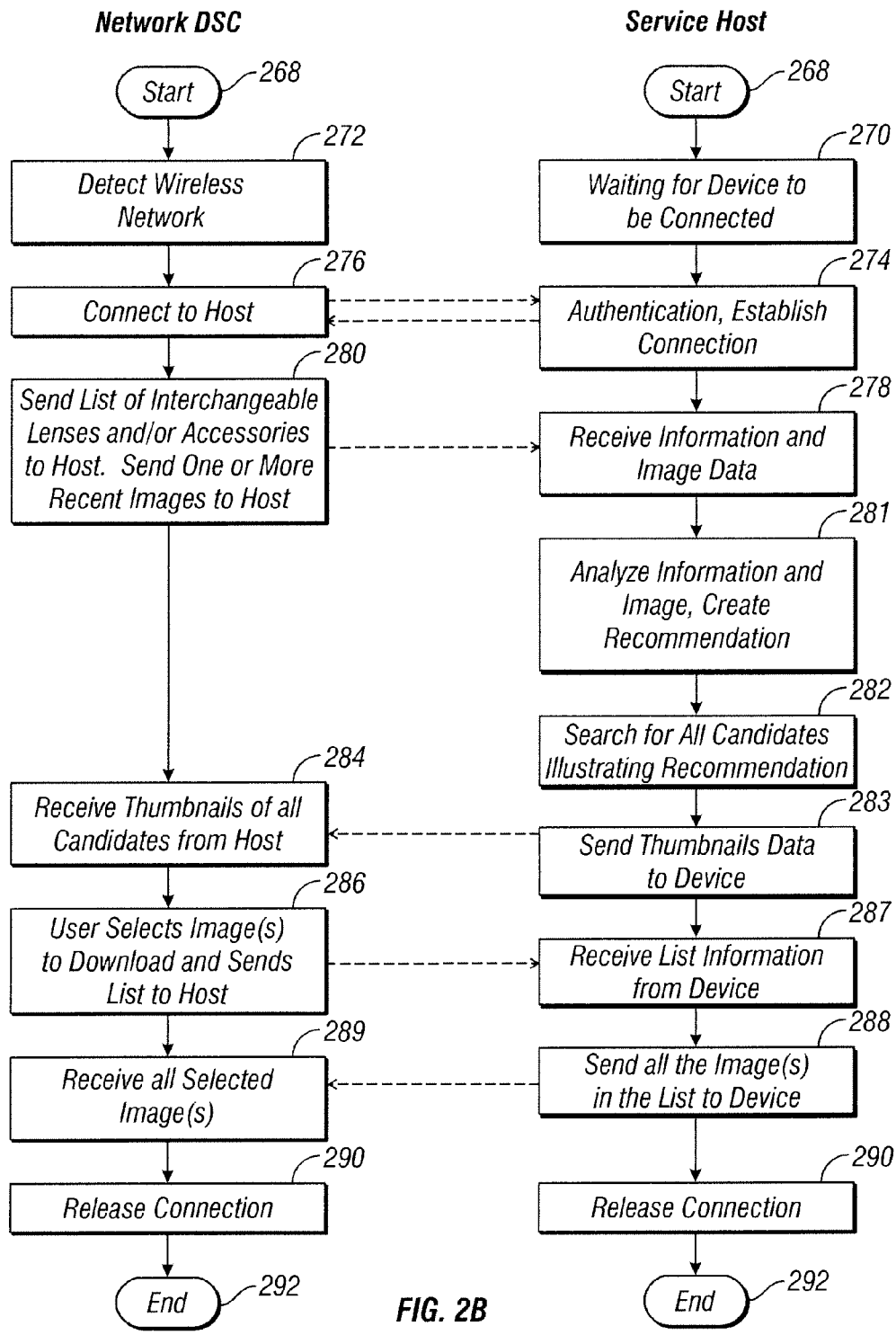
FIG. 2b is a flow diagram illustrating an example process for connecting to a wireless network and host and sending interchangeable lenses and/or accessory information and one or more recent images to the service host.

FIG. 2b illustrates a process to sends lens and accessory information and at least one recent photograph to the service host to aid the service host in creating recommendations for the user. The steps in this process are similar to those of FIG. 2a, except that at step 280, the camera also sends one or more recent images to the host for analysis. The images sent to the host can be thumbnails or full size images, and can be sent with data pertaining to the image capture. For example, camera setting data automatically captured by the camera such as shooting mode, shutter speed, aperture setting, exposure compensation setting, ISO setting, and so on, can be included with the uploaded images. As a further example, scene information such as date, time and place can be sent. Additionally, in one embodiment, user-entered data can be included as well.

The host can be configured to analyze the image using well-known image processing techniques and recommend setting updates to the user. For example, well known contrast, white balance, brightness and other image processing techniques can be used to analyze the image data and recommend setting corrections.

Figure 3:
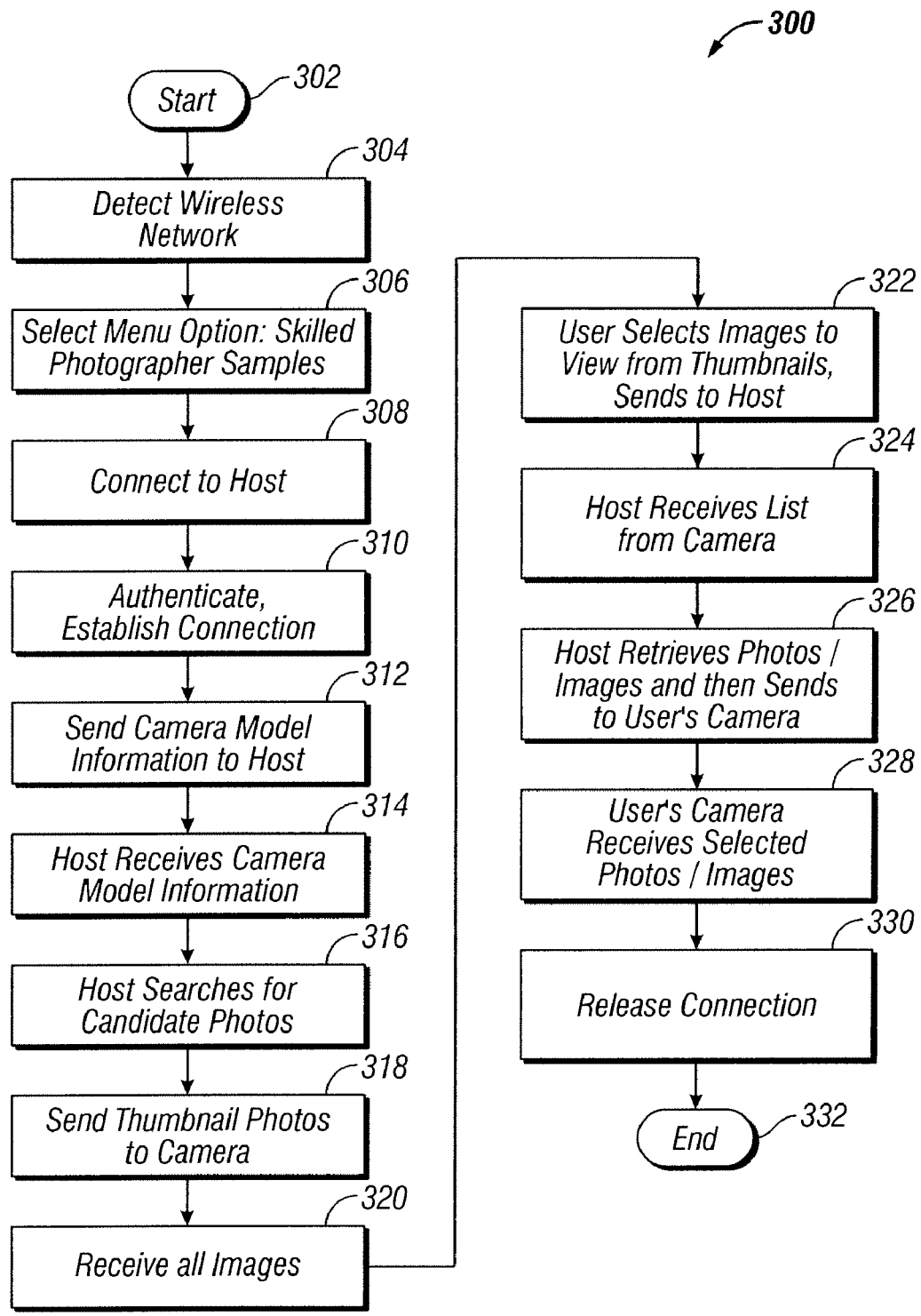
FIG. 3 is a flow diagram illustrating an example of feature downloading example photographs taken by a skilled photographer using the camera in accordance with one embodiment of the invention.

FIG. 3 illustrates a process for responding to a camera user's query to see examples of photographs taken by a skilled photographer using the same camera model. The process 300, begins with the camera user formulating a query at the start 302 of the process. The camera first detects the wireless network in step 304. Once the network is detected, the user selects the menu options for the specific option: Skilled Photographer Samples—Camera Model in step 306. The camera connects to the service host in step 308. The service host authenticates the camera and establishes the connection in step 310. The camera model information is sent to the service host over the wireless connection in step 312. The service host receives the camera model information in step 314. Once the service host has the camera model information, it begins to search for candidate thumbnail photos matching the criteria in step 316. The thumbnails are then sent to the user's camera in step 318. In step 320, the user's camera receives the thumbnails. The camera user views the thumbnails and selects several to view in a larger size for tutorial purposes. The selection information is sent to the service host in step 322. The service host then receives the selected photograph or image list in step 324. The service host retrieves the selected photographs or images and then sends the photographs or images to the user's camera in step 326. The connection is then released in step 330 and the process ends, 332.

Figure 4:
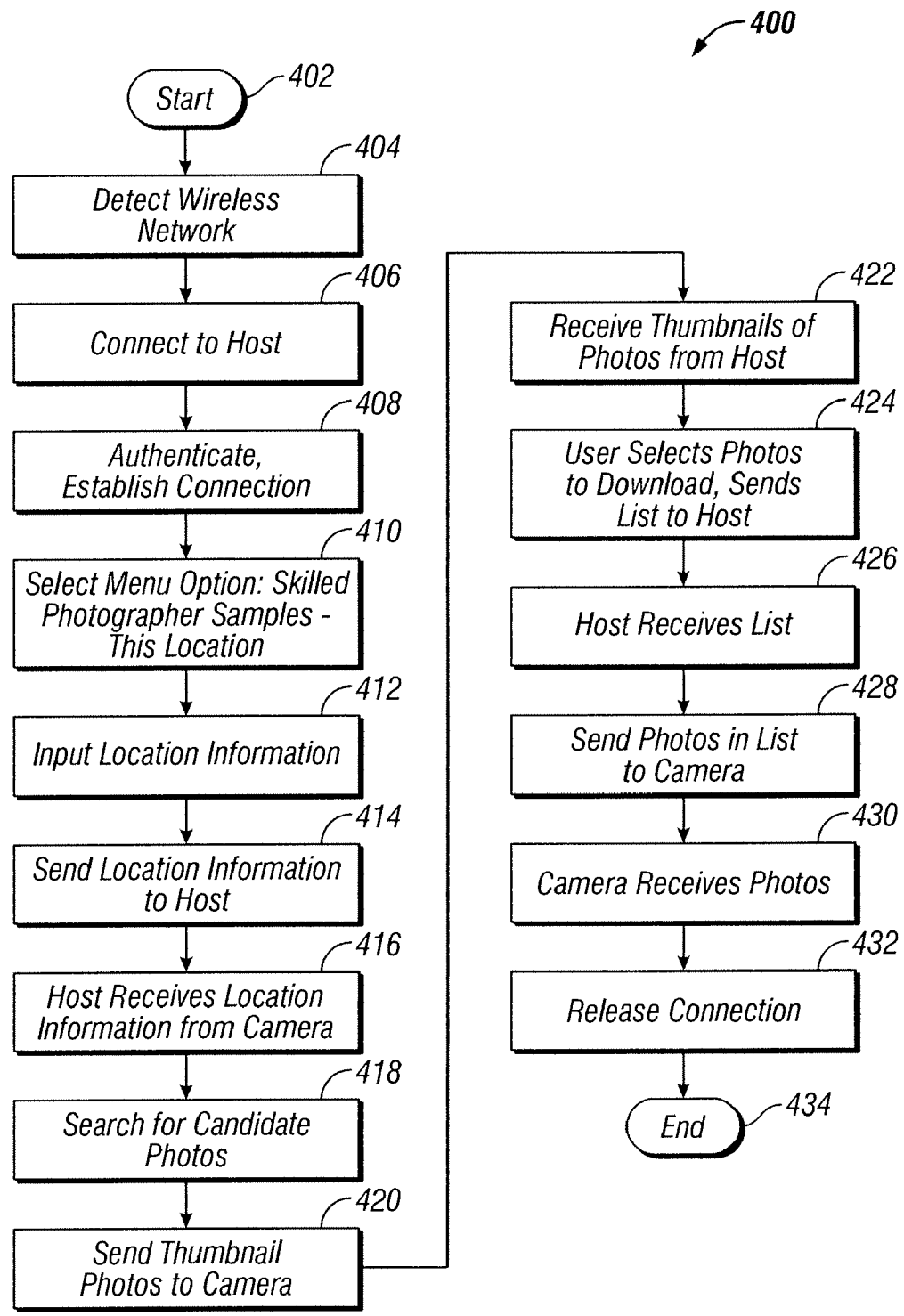
FIG. 4 is a diagram illustrating an example of downloading example photographs taken by a skilled photographer at the same location in accordance with one embodiment of the invention.

A further embodiment is illustrated in FIG. 4. FIG. 4 is a flow chart for a process for responding to a user's query for examples of a professional photographer's photographs taken at the same location. This feature incorporates position location information (for example, from a GPS or otherwise) with the user's query to provide example photographs. Because many amateur photographers travel with their cameras, this feature can provide example photographs and offers an opportunity for site-specific tutorials for those looking to take improved photographs while traveling. The amateur photographer can learn from the professional's photographs how best to frame shots at a location, and particular points of vantage that may offer different perspectives. The amateur photographer may also receive camera setting and other information such as for example, how to configure the camera beyond the fully automatic mode for unique circumstances offered by the scene to be photographed. Additionally, pointers, tips or other tutorial information might be downloaded so that the user can read information on taking an improved shot at that scene.

The method, 400, begins at the start, 402. The user's camera first detects the wireless network in step 404. The camera then connects to the service host at step 406. The service host authenticates the user's camera and establishes a connection in step 408. The user then inputs location information, such as a zip or postal code, address, latitude and longitude, point-of-interest identification or waits for location verification based on satellite or other position determination data. The user selects the menu option: Skilled Photographer—Location Examples in step 410 and inputs location information in step 412. The camera sends the location information to the service host over the wireless network in step 414. The service host receives the location information in step 416. The service host then searches the database for sample photographs that match the user's location query in step 418. The service host then sends thumbnail photographs to the user at step 420. The user receives the thumbnails and other information in step 422. The user reviews the thumbnails and determines which photographs to obtain information or to view in larger size and sends this information to the service host in step 424. The service host receives the list at step 426 and sends the identified photographs to the camera at step 428. The user's camera then receives the photographs at step 430. The connection is released at step 432 and the process then ends, 434.

Figure 5:
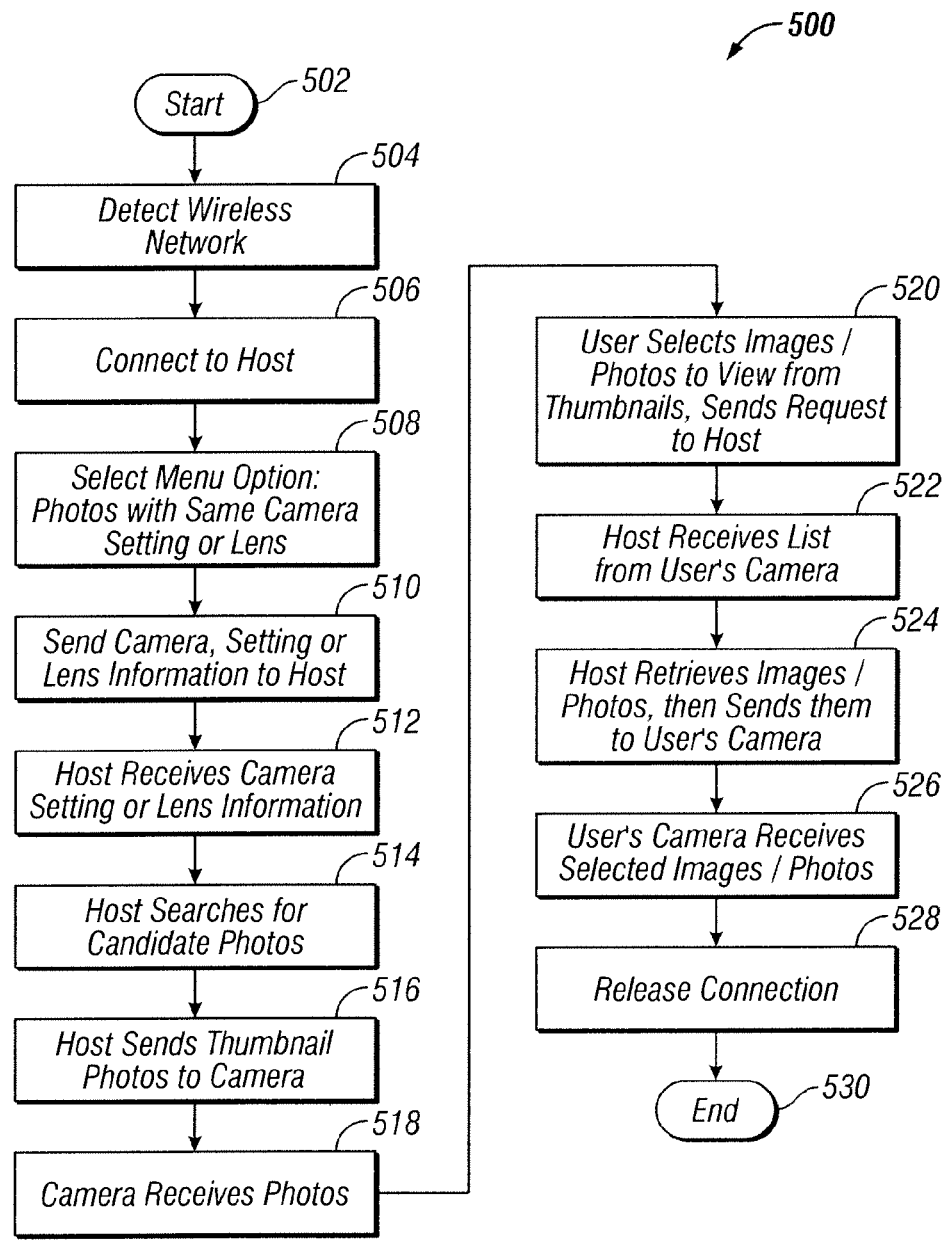
FIG. 5 is a diagram illustrating another example of downloading example photographs taken with the same camera, lens, and settings by the camera owner in accordance with one embodiment of the invention.

In another embodiment, a user can upload information and photographs previously taken by him or her at various locations, and can also upload accompanying setting or other information for later recall. FIG. 5 provides an illustration of a method for retrieving photographs taken by the camera user previously. Particularly, the example of FIG. 5 is an example of the user retrieving images and information using the same camera, lens or setting. The process, 500, starts 502 with the user deciding to view previously taken photographs of his or her own that match a camera model, lens, or setting configuration. The camera first detects the wireless network in step 504. The camera connects to the host in step 506. The camera user then selects a menu option that provides the desired query: Photographs taken previously by camera user with same camera model, lens or setting, in step 508. In step 510 the camera model, lens, or setting information is sent to the service host. The service host receives the query in step 512. The service host then searches for candidate photographs that match the query in step 514. The service host then sends the candidate photographs as thumbnails to the user's camera in step 516. The user's camera receives the thumbnails in step 518. The user views the thumbnails and selects images or photographs to download in larger size from the service host in step 520. The service host receives the list of requested images or photographs in step 522. In step 524, the service host retrieves the specified images or photographs and sends them to the user's camera. The user's camera receives the images or photographs over the wireless network in step 526. Delivery completed, both the user's camera and the service host release the wireless connection in step 528 and the process is competed, 530.

Figure 6:
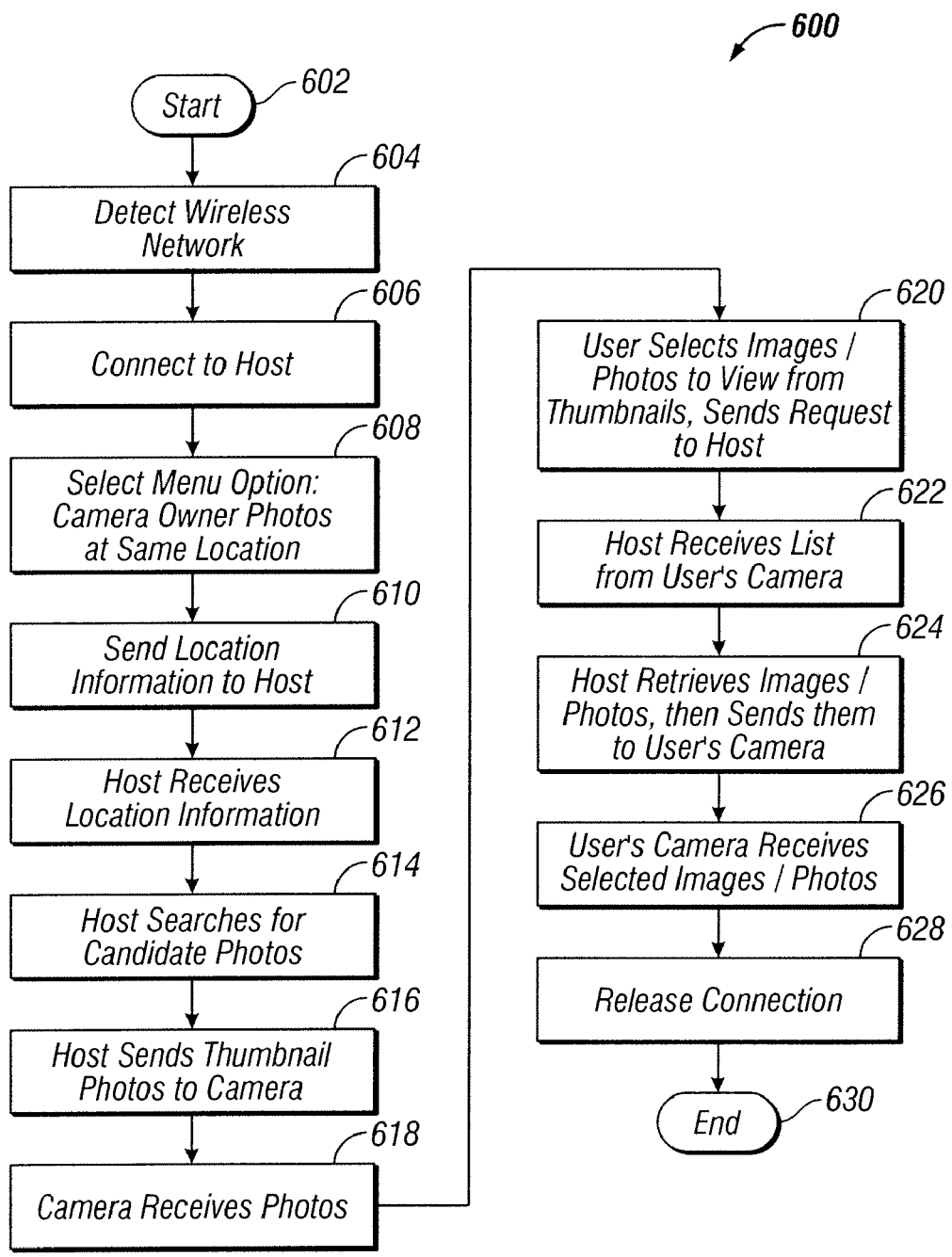
FIG. 6 is a diagram illustrating an example process for downloading previous photographs by the camera owner at the same location in accordance with one embodiment of the invention.

FIG. 6 describes a process for a user to retrieve a photograph taken at the same location on a prior visit. The process, 600, starts 602 with the user's camera detecting the wireless network in step 604. The user's camera connects to the service host in step 606. The user selects a menu option for camera owner photographs at location and enters the necessary location information in step 608. This location information is sent to the service host in step 610. The service host receives the location information in step 612 and begins searching for candidate photographs that match the location information in step 614. In step 616 the service host sends thumbnail photographs to the user's camera in step 618. The user's camera receives these photographs in step 618. After reviewing the thumbnails, the user selects which photographs to download and sends the information to the service host over the wireless network in step 620. The service host receives the list of selected photographs in step 622 and retrieves the photographs. The photographs are sent to the user's camera over the wireless network in step 624. The user then receives the requested photographs on the camera in step 626. The connection is released in step 628 and the process concludes, step 630.

Figure 7:
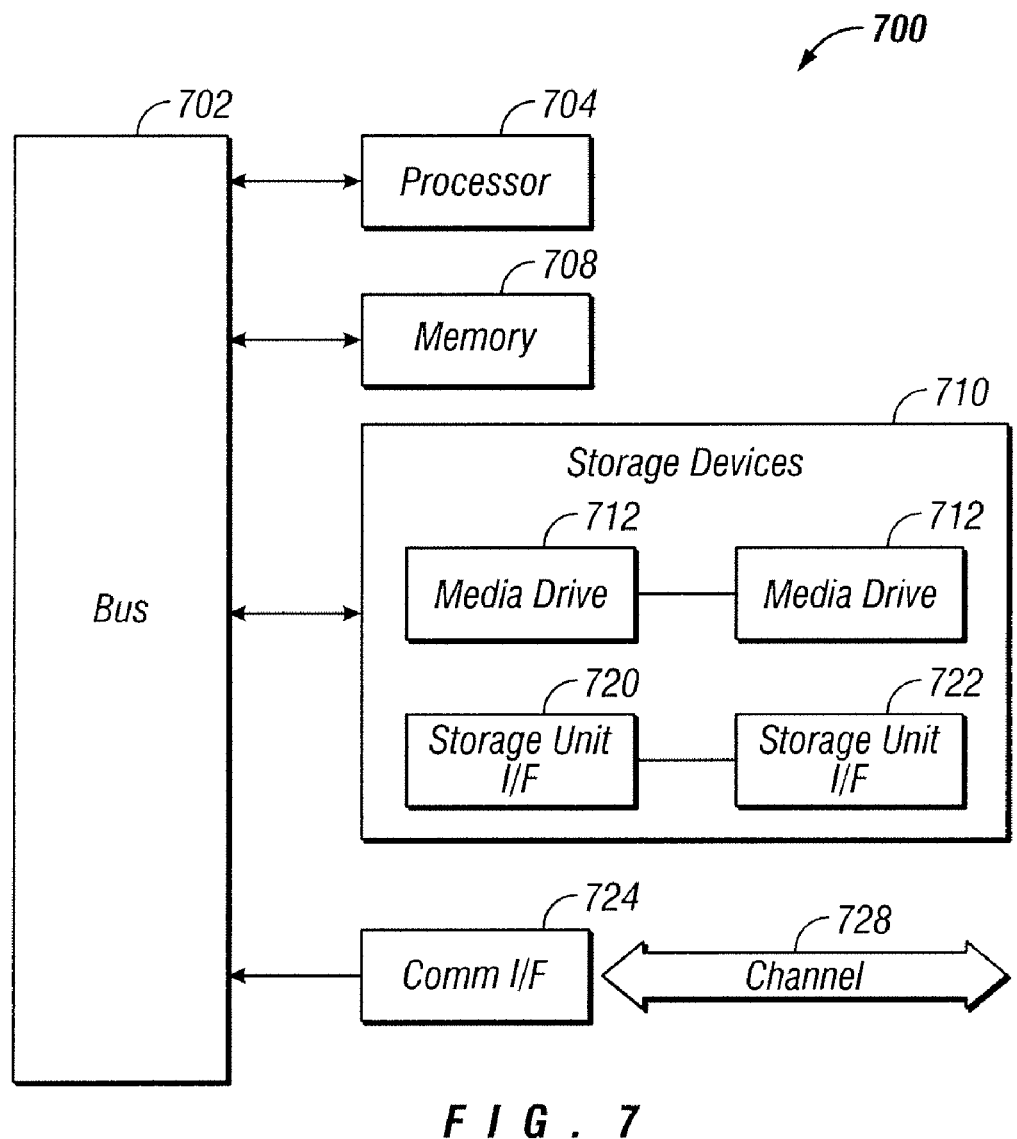
FIG. 7 is a diagram illustrating an example computing module in accordance with an embodiment of the invention.

As used herein, the term module is used to describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example computing module 700. After reading this description, it will become apparent to a person skilled in the relevant art how to implement the invention using other computing modules or architectures.

Images, data and other information can be downloaded in real-time or near-real-time while the photographer is at the location of interest. Additionally, the images, data and other information can be identified and downloaded at other times such as before or after the time at which the photographer is that the location of interest. For example, in one embodiment, the user can enable the camera and download information in advance of a trip or other outing that she or he is planning to take. As described above, the user can enter location information of the locations planned for the outing and select information to be downloaded in advance of the outing. Similarly, upon return from the outing, the user can select locations visited and download information about those locations visited to get pointers, samples, or other information about places he or she already visited.

In another embodiment, a PC-based or other computing platform-based application can be provided to facilitate downloading images, data and other information. For example, a PC-based application can be provided that allows the user to plan a photographic outing to one or more locations, to identify areas of photographic interests, and to download information to assist in photography at those locations. Accordingly, the user can review this information in advance of the outing on the PC. Additionally, a link can be provided between computing platform can be imaging device such that information downloaded at the computer can be shared with the camera. For example, the user may launch the application, query the server for images, data and other information about various locations, download the data to the PC and download some or all of the data to the camera. Additionally, the user may upload images from the camera to the PC to compare them to images retrieved from the server. In yet a further embodiment, the application may provide the ability to query the server to identify photographic points of interest or otherwise facilitate trip planning. By way of further example, trip planning information such as points of interest, suggested times of day or times of year for photographing particular locations, vantage points, and other suggestions and information can be provided for trip planning purposes. Additionally, the user can be given the ability to upload and share his or her own photographs with the community of other interested photographers. Accordingly, user photographs can be catalogued and stored with their accompanying information. Photographs can be indexed according to, for example, location, date, time and other information to facilitate searching by others in the community. Additional information can be provided with a photographs such as camera settings and parameters and other like data as well as tutorials or other descriptions at the user may wish to upload to accompany his or her photographs.

Referring now to FIG. 7, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special or general purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, modems, routers, WAPs, and any other electronic device that might include some form or processing capabilities.

Computing module 700 might include one or more processors or processing devices, such as a processor 704. Processor 704 might be implemented using a general-purpose or special-purpose processing engine such as, for example, a microprocessor, controller, or other control logic. In the example illustrated in FIG. 7, processor 704 is connected to a bus 702 or other communication medium to facilitate interaction with other components of computing module 700.

Computing module 700 might also include one or more memory modules, referred to as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive. Accordingly, storage media 714, might include, for example, a hard disk, a floppy disk, magnetic tape, optical disk, a CD or DVD, or other fixed or removable medium that is read by, written to or accessed by media drive 712. As these examples illustrate, the storage media 714 can include a computer usable storage medium having stored therein particular computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, 802.XX or other interface), a communications port (such as for example, a USB port, IR. port, RS232 port Bluetooth interface, or other port), or other communications interface. Software and data transferred via communications interface 724 might typically be carried on signals, which can be electronic, electromagnetic, optical or other signals capable of being exchanged by a given communications interface 724. These signals might be provided to communications interface 724 via a channel 728. This channel 728 might carry signals and might be implemented using a wired or wireless medium. Some examples of a channel might include a phone line, a cellular phone link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and signals on channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:
1. A digital camera, comprising:
a body;
an image sensor in the body;
a lens configured to focus a scene onto the image sensor;
a wireless communication unit;
a control unit;
a download setting unit; and
executable program code embodied in a computer readable medium and configured to cause the download setting unit to select a subset of digital images to download from a communication network in response to a user query;
wherein: (a) the user query specifies the subset of digital images to be images taken by a same camera model, or images taken using a same lens or a lens having similar characteristics, or images taken using same, similar, or current camera settings; or (b) the user query includes camera location information, wherein the subset of digi- tal images comprises images taken at the camera location and that were taken by a professional photographer.

2. The digital camera of claim 1, wherein the images taken by the same camera model were taken by a professional photographer.

3. The digital camera of claim 1, wherein the user query including camera location information further includes time information and wherein the subset of digital images comprises images taken at the camera location and time and that were taken by the professional photographer.

4. The digital camera of claim 1, wherein the user query specifies the subset of digital images taken by the same camera model were taken by the user.

5. A method for downloading images, comprising:
connecting to a service host through a wireless service unit;
sending a user query to the service host requesting a subset of digital images that match a user-specified criteria;
receiving thumbnail images from the service host that match the user-specified criteria;
selecting images to download from the thumbnail images;
sending a request to the service host for the selected images; and
downloading the selected images; and
wherein: (a) the user query specifies the subset of digital images to be images taken by a same camera model, or images taken using a same lens or a lens having similar characteristics or images taken using same, similar or current camera settings; or (b) the user query includes camera location information, wherein the subset of digital images comprises images taken at the camera location and that were taken by a professional photographer.

6. The method of claim 5, wherein the images taken by the same camera model were taken by a professional photographer.

7. The method of claim 5, wherein the user query including camera location information further includes time information and wherein the subset of digital images comprises images taken at the camera location and time and that were taken by the professional photographer.

8. The method of claim 5, wherein the user query specifies the subset of digital images taken by the same camera model were taken by the user.

9. An apparatus for downloading images, comprising:
means for connecting to a service host through a wireless service unit;
means for sending a user query to the service host requesting a subset of digital images that match a user-specified criteria;
means for receiving thumbnail images from the service host that match the user-specified criteria;
means for selecting images to download from the thumbnail images;
means for sending a request to the service host for the selected images; and
downloading the selected images; and
wherein: (a) the user query specifies the subset of digital images to be images taken by a same came model or images taken using a same lens or a lens having similar characteristics, or images taken using same, similar or current camera settings; or (b) the user query includes camera location information, wherein the subset of digital images comprises images taken at the camera location and that were taken by a professional photographer.

10. The apparatus of claim 9, wherein the images taken by the same camera model were taken by a professional photographer.

11. The apparatus of claim 9, wherein the user query including camera location information further includes time information and wherein the subset of digital images comprises images taken at the camera location and time and that were taken by the professional photographer.

12. The apparatus of claim 9, wherein the user query specifies the subset of digital images taken by the same camera model were taken by the user.

13. A computer program contained on a non-transitory computer-readable medium, comprising:
first executable program code to cause a computer to connect to a service host through a wireless service unit;
second executable program code to cause a computer to send a user query to the service host requesting a subset of digital images that match a user-specified criteria;
third executable program code to cause a computer to receiving receive thumbnail images from the service host that match the user-specified criteria;
fourth executable program code to cause a computer to select images to download from the thumbnail images in response to a user's selection;
fifth executable program ode to cause a computer to send a request to the service host for the selected images; and
sixth executable program code to cause a computer to download the selected images;
wherein: (a) the user query specifies the subset of digital images to be images taken by a same camera model, or ages taken using a same lens or a lens having similar characteristics, or images taken using same, similar, or current camera settings; or (b) the user query includes camera location information wherein the subset of digital images comprises images taken at the camera location and that were taken by a professional photographer.

14. The computer program of claim 13, wherein the images taken by the same camera model were taken by a professional photographer.

15. The computer program of claim 13, wherein the user query including camera location information further includes time information and wherein the subset of digital images comprises images taken at the camera location and time and that were taken by the professional photographer.

16. The computer program of claim 13, wherein the user query specifies the subset of digital images taken by the same camera model were taken by the user.

17. A processor comprising non-transitory computer executable logic, the logic configured to execute program code, the program code comprising:
first executable program code to cause a computer to connect to a service host through a wireless service unit;
second executable program code to cause a computer to send a user query to the service host requesting a subset of digital images that match a user-specified criteria;
third executable program code to cause a computer to receive thumbnail images from the service host that match the user-specified criteria;
fourth executable program code to cause a computer to select images to download from the thumbnail images in response to a user's selection;
fifth executable program code to cause a computer to send a request to the service host for the selected images; and
sixth executable program code to cause a computer to download the selected images;
wherein: (a) the user query specifies the subset of digital images to be images taken by a same camera model, or images taken using a same lens or a lens having similar characteristics, or images taken using same, similar, or current camera settings; or (b) the user query includes camera location information, wherein the subset of digital images comprises images taken at the camera location and that were taken by a professional photographer.

18. The processor of claim 17, wherein the images taken by the same camera model were taken by a professional photographer.

19. The processor of claim 17, wherein the user query including camera location information further includes time information and wherein the subset of digital images comprises images taken at the camera location and time and that were taken by the professional photographer.

20. The processor of claim 17, wherein the user query specifies the subset of digital images taken by the same camera model were taken by the user.

* * * * *